Figure 1:
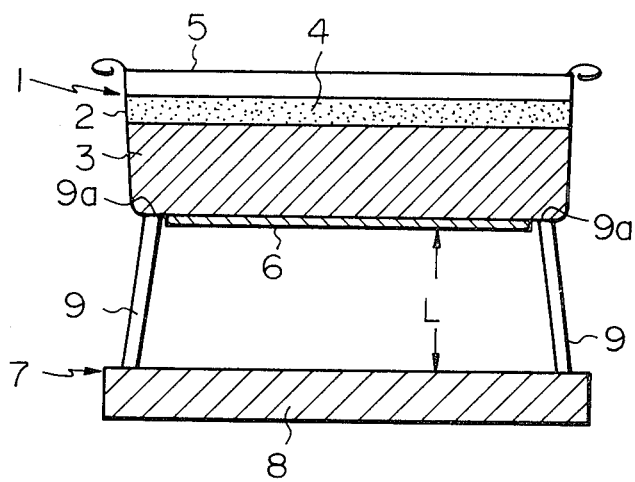

[19] United States Patent
Takei

[11] 4,330,506
[45] May 18, 1982

[54] THERMOEVAPORATIVE INSECTICIDAL APPARATUS AND A CONTAINER ASSEMBLY USED THEREIN

[75] Inventor: Yasuharu Takei, Hiroshima, Japan

[73] Assignee: Fumakilla Limited, Tokyo, Japan

[21] Appl. No.: 123,183

[22] Filed: Feb. 20, 1980

[30] Foreign Application Priority Data

Feb. 20, 1979 [JP] Japan .................................. 54-19756
Mar. 27, 1979 [JP] Japan .................................. 54-38739

[51] Int. Cl.³ ........................ A01L 2/00; A01M 13/00
[52] U.S. Cl. ..................................... 422/305; 43/125; 43/129; 422/125
[58] Field of Search ................................ 422/28–37, 422/39, 125, 305; 43/129, 125

[56] References Cited

U.S. PATENT DOCUMENTS 4,093,424  6/1978  Yoshida et al.
4,163,038  7/1979  Nishimura et al. .............. 422/36
4,171,340  10/1979  Nishimura et al. .............. 422/36
4,199,548  4/1980  Kaiho et al. ..................... 422/305

Primary Examiner—Barry Richman
Attorney, Agent, or Firm—Browdy and Neimark

[57] ABSTRACT

A thermoevaporative insecticidal apparatus comprises a heat generating element 1 closely fitted to a porous carrier 6 the surface of which is impregnated with an effective ingredient and a receptacle 7 composed of a receiving tray 8 on which a plurality of supporting stands are disposed said heat generating element 1 being supported on the receptacle 7 so that said porous carrier 6 faces down opposite the receiving tray 8 and that said tray 8 is spaced from said porous carrier 6 by a distance of at least 1 cm; and a safety container assembly for use in the above type thermoevaporative insecticidal apparatus wherein a heat resistant supporting member 18 is attached to the annular outer surrounding walls 13 of a container member 14 so that said heat generating element is supportable by said heat resistant supporting member 18.

1 Claim, 19 Drawing Figures

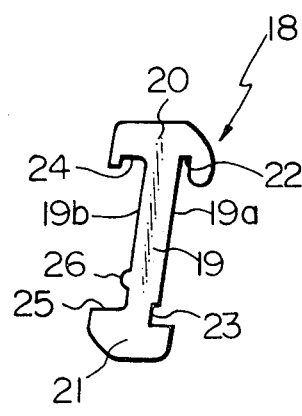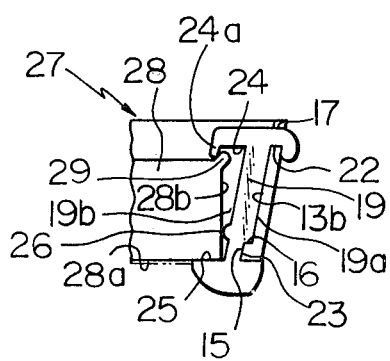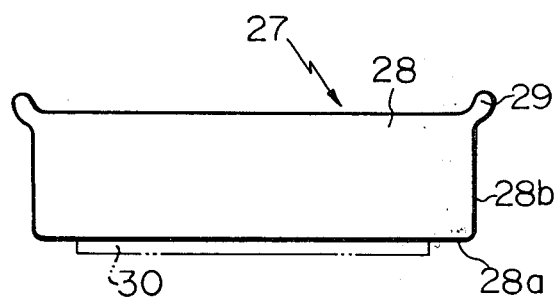

THERMOEVAPORATIVE INSECTICIDAL APPARATUS AND A CONTAINER ASSEMBLY USED THEREIN

This invention relates to a thermoevaporative insecticidal apparatus comprising a heat generating element closely fitted to a porous carrier impregnated with an effective ingredient and a receptable for supporting said heat generating element. The invention also relates to a container for use in such apparatus.

The apparatus of this invetion is first described by reference to the accompanying drawings. FIG. 1 shows a heat generating element 1 that consists of a metallic container 2 which is filled in an inert gas atmosphere with a heat generating agent 3 of the type described in Japanese Patent Public Disclosures No. 108382/77 and No. 108383/77 that reacts with air upon contact to increase its temperature. The agent 3 is covered with a heat resistant sheet 4 which is further covered with a cap 5 to provide a hermetic enclosure. The bottom of the container 2 has closely fitted thereto a porous carrier 6 impregnated with an active ingredient.

The heat generating agent 3 taught in the above identified two prior art references is described below.

The heat generating agent available for use in this invention that contacts oxygen (or air) to generate heat comprises (A) a sulfide, polysulfide or hydrosulfide of an alkali metal or a salt hydrate thereof and (B) a compound which acts as a catalyst for (A) when it generates heat upon contact with oxygen. Examples of (A) include powder of sulfides, polysulfides or hydrosulfides of alkali metals such as Li, Na, K, Rb and Ca or salt hydrates thereof, and these may be used independently or as a mixture. Preferred alkali metals are Na and K, and Na is particularly preferred. The compounds selected as (A) are thermally stable in air and do not generate heat until they are mixed with a carbonaceous material, say, carbon black that is selected as (B) which will be described below. The component (B) is at least one compound such as of a carbonaceous material, iron carbide and activated clay. Examples of the carbonaceous material include carbon black, activated carbon, charcoal, coke, pitch, asphalt, graphite and soot. Materials having high surface activity such as carbon black, activated carbon and charcoal are preferred because they help component (A) generate more heat. Such carbonaceous material may be supported on a carrier to constitute the component (B). The iron carbide can be prepared by thermally decomposing Prussian blue in an inert or non-oxidizing atmosphere (see Japanese Patent Application Disclosures Nos. 22000/75, 116397/75 and 45700/76). The activated clay may be used independently or in combination with carbonaceous material or iron carbide as component (B).

While components (A) and (B) may be of any particle size, smaller sizes are effective for generation of heat, and 10 mesh or smaller size is preferred.

The mechanism by which the heat generating agent generates heat is not altogether clear, but basically, component (A) that is oxidized with oxygen to generate heat can be considered the source of heat, and component (B) plausibly functions as an oxidization catalyst. This assumption is based on the fact that, as described before, component (A) itself does not generate heat in air but generates heat only in combination with component (B), and that analysis of the product of the exothermic reaction shows the presence of a great amount of sulfate or thiosulfate residue. Therefore, a desired amount of heat (cal/g) can be generated by varying the mixing ratio of the heat source component (A) and the catalyst component (B), and component (A) is preferably used in an amount between 10 and 90 wt%. If it is used in an amount smaller than 10 wt%, an adequate amount of heat is not generated, and if the amount is greater than 90 wt%, the efficiency of heat generation is decreased due to insufficient contact with component (B). Compounds other than those specified above as preferred examples can be selected as components (A) and (B) to provide the heat generating agent if they obviate the need of supplying water during thermoevaporation.

The heat generating rate and generating period can be freely controlled by changing the area of contact with air (or oxygen), stated specifically, the particle size of components (A) and (B), the amount of air flown in, and the type and amount of a filler.

The heat generating agent may optionally contain a filler as component (C) which serves as a thermo-buffer or an insulating material that inhibits sudden change in temperature due to heat generation or dissipation. For this purpose, the filler is preferably porous, air permeable and of low specific gravity. Preferred examples include woodmeal, natural fiber flocks such as cotton linter and cellulose, synthetic fiber flocks such as polyether, synthetic resin foam dust such as polystyrene and polyurethane, silica powder, porous silica gel, Glauber's salt, calcium sulfate, sodium carbonate, barium sulfate, iron oxide, aluminum oxide and asbestos. If such filler need be formed, a forming aid may be added to the filler. The ratio of component (C) to components (A) and (B) is in the range of from 0/100 to 90/10, preferably from 20/80 to 70/30.

Air is the most convenient and inexpensive source of oxygen, but the object of this invention can also be achieved by pure oxygen or a substance that undergoes a chemical reaction to produce oxygen.

The heat generating agent can generate a temperature up to about 1000° C., and, as described above, the temperature and time of heat generation can be controlled freely. To take the example of pyrethroid, short evaporation can be achieved by heating at 250° to 400° C., and long evaporation by heating at 150° to 250° C.

The numeral 7 represents a receptacle that consists of a receiving tray 8 to which a plurality of supporting stands 9 are fixed that are spaced from each other along the periphery of the tray. Said heat generating element 1 rests on the upper end 9a of each supporting stand 9.

Before accomplishing this invention, the inventors made a run of tests with a thermoevaporative insecticidal apparatus of the construction described above to determine the percents evaporation, residue, decomposition, deposition, and temperature by fitting apparatus 1 inside a closed enclosure and by varying the distance between the receiving tray 8 and a porous carrier 6 fitted to the bottom of the container 2. By the percent evaporation is meant the ratio of the amount of the active ingredient deposited on the internal walls of the closed enclosure in which the apparatus is placed to the total amount of the active ingredient with which the porous carrier 6 was impregnated; the percent residue means the ratio of the amount of the active ingredient remaining in the porous carrier 6 after evaporation to that of the active ingredient with which the porous carrier 6 was impregnated; the percent deposition means the ratio of the amount of the active ingredient deposited on the receiving tray 8 to the total amount of the active ingredient with which the porous carrier 6 was impregnated; the percent decomposition means the ratio of total amount of the active ingredient with which the carrier 6 was impregnated minus the percent evaporation, percent residue and percent deposition to the total amount of the active ingredient with which the porous carrier 6 was impregnated; the temperature means the temperature in the center of the porous carrier 6.

The results of the tests are summarized below.

(1) Direction of evaporation versus the temperature of the generating element

| Temp. Direction of evaporation | Time (min) | | | | | |
|---|---|---|---|---|---|---|
| | 5 | 10 | 15 | 20 | 25 | 30 |
| Downward | 173° C. | 215° C. | 243° C. | 233° C. | 222° C. | 200° C. |
| Upward | 131° C. | 190° C. | 197° C. | 189° C. | 184° C. | 171° C. |

(2) Direction of evaporation versus percents evaporation and decomposition

| Direction of evaporation | percent evaporation | present decomposition |
|---|---|---|
| Downward | 93.4% | 5.3% |
| Upward | 31.8% | 11.4% |

(3) Change in percents evaporation (downward), residue, deposition and temperature depending upon the distance L between porous carrier 6 and receiving tray 8

| Distance (cm) | percent evaporation p.c. | residue p.c. | deposition | temp. (°C.) |
|---|---|---|---|---|
| 0.3 | 28.1 | 6.4 | 56.0 | 330 |
| 0.5 | 59.7 | 2.9 | 31.8 | 310 |
| 1.0 | 90.7 | 0.1 | 4.3 | 260 |
| 2.0 | 94.2 | 0.1 | 1.1 | 250 |

Based on the experimental data shown above, this invention separates the receiving tray 8 from the porous carrier 6 by a distance (L) of at least 1cm and attaches the carrier to the bottom of the metal container 2 so that it faces down. This arrangement provides high insecticidal effect by achieving efficient evaporation of the active ingredient with which the porous carrier 6 is impregnated.

In this connection, the inventors have found that the insecticidal activity of a pyrethroid insecticide can be remarkably enhanced by evaporating at a temperature between 150° and 400° C., a composition prepared by incorporating in the pyrethroid insecticide at least one compound selected from the group consisting of a phthalic ester, aliphatic ester, aliphatic alcohol, polyhydric alcohol, glycol ether and a hydrocarbon having 10 or more carbon atoms and at least one antioxidant said compound being 1–3.2 times the weight of said insecticide and said antioxidant being from 5 to 10% by weight of said insecticide.

The pyrethroid insecticide as used herein is at least one compound selected from the group consisting of 3-allyl-2-methylcyclopent-2-en-4-on-1-yl dl-cis,trans-chrysanthemate; 3-allyl-2-methylcyclopent-2-en-4-on-1-yl d-cis,trans-chrysanthemate; d-3-allyl-2-methylcyclopent-2-en-4-on-1-yl d-transchrysanthemate; 3-phenoxybenzyl-d-cis,trans-chrysanthemate; 3-phenoxybenzyl-dl-cis,trans-3-(2,2-dichlorovinyl)-2,2-dimethyl-1-dichloropropane carboxylate; and 5-benzyl-3-furylmethyl dl-cis,trans-chrysanthemate.

The phthalic ester is at least one compound selected from the group consisting of dimethyl phthalate, diethyl phthalate, dibutyl phthalate, di-2-ethylhexyl phthalate, diisodecyl phthalate, dilauryl phthalate and dibenzyl phthalate.

The aliphatic ester is at least one compound selected from the group consisting of butyl oleate, methyl stearate, butyl stearate, methyl myristate, and isopropyl myristate.

The aliphatic dibasic ester is at least one compound selected from the group consisting of tributyl citrate, acetylbutyl citrate, dibutyl maleate, di-2-ethylhexyl adipate, diisodecyl adipate, diiso-octyl sebacate, di-2-ethylhexyl sebacate and dibenzyl sebacate.

The aromatic carboxylic ester is at least one compound selected from the group consisting of triiso-octyl trimellitate and butylphthalylbutyl glycolate.

The higher aliphatic alcohol is at least one compound selected from the group consisting of oleyl alcohol and lauryl alcohol.

The polyhydric alcohol is at least one compound selected from the group consisting of diethylene glycol and dipropylene glycol.

The glycol ether is diethylene glycol monobutyl ether.

The hydrocarbon having 10 or more carbon atoms is at least one compound selected from the group consisting of polybutene, decane and undecane. The antioxidant is at least one compound selected from the group consisting of dibutylhydroxy toluene, butylhydroxy anisole, n-propyl gallate, tocopherol, 2,5-di-tertiary butyl hydroquinone, octadecyl-3-(3,5-ditertiarybutyl-4-hydroxyphenyl) propionate, pentaerythtyl-tetrakis[3-(3,5-ditertbutyl-4-hydroxyphenyl)propionate], 4,4'-thiobis(3-methyl-6-tertiarybutyl phenol), and 2,2'-methylene-bis-(4-methyl-6-tertiarybutyl phenol).

The composition may further contain a conventional additive such as a sizing agent, a colorant, a color developing agent, and a stabilizer.

The thermoevaporative insecticidal apparatus of this invention therefore works very effectively by achieving efficient evaporation of the active ingredient with which the porous carrier 6 is impregnated.

The second embodiment of this invention relates to a safety container assembly insulated from the heat generated by the heat generating element.

In recent years, a variety of thermoevaporative insecticidal apparatus have been proposed. They use as a heat generating agent a substance that contacts air to increase its temperature, a substance that contacts water to increase its temperature or a substance composed of a mixture of compounds that are ignited to increase its temperature. Such substance is contained in a hermetic container together with an aroma-imparting agent and an active ingredient, or it is contained in a heating generating element to which an active ingredient is attached. In use, the container is opened, water is filled in the container or the heat generating element is ignited to thereby let the active ingredient evaporate.

One problem with these apparatuses is that due to the heat generated by the heat generating agent, the temperature of the container reaches a very high level (about several hundred degrees Centigrade) and that therefore, placing the container in a room or other places directly will damage the place where it is placed, cause a fire or presents a burn hazard to a human.

The second embodiment of this invention aims at solving such problem with the conventional thermo-evaporative insecticidal apparatus, and the primary purpose of the invention is to provide a safety container assembly that is insulated from the heat generated by a heat generating agent, can be hand-carried when in use and which can be manufactured at reasonable cost.

Figure 2:
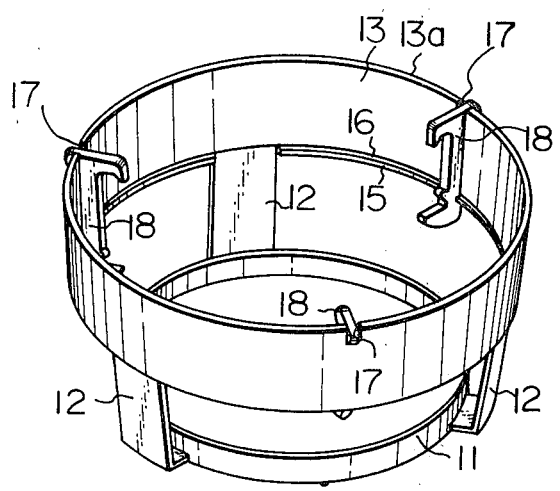

The safety container assembly of this invention is now described by reference to FIGS. 2 to 19. FIG. 2 shows a safety container 14 which comprises a disk of bottom wall 11 which is surrounded by a plurality of narrow and oblique installation walls 12 which are integral with the bottom wall and disposed at equal intervals along the periphery of the bottom wall. A thin-walled annular outer wall 13 having a top diameter greater than the bottom diameter is integrally disposed on the upper end of each installation wall 12.

An annular projection 15 is disposed integrally with the lower inner periphery of the annular outer wall 13 to form an upward facing elevation 16. A plurality of notches 17 are cut in the upper periphery 13a, with each being positioned intermediate between two adjacent installation walls 13 along said periphery. A heat resistant holder 18 is disposed in engagement with each notch 17.

By reference to FIG. 5, the heat resistant holder 18 is composed of a base 19 which is integral with an upper lid 20 and a lower lid 21. The upper lid 20 combines with one side 19a of the base to form an upper installation groove 22 which engages said notch 17. The lower lid 21 combines with the side 19a of the base to form a lower installation groove 23 that engages said annular projection 15. The upper and lower grooves 22 and 23 act together to provide intimate contact between said side 19a and the inner surface 13b of the annular outer wall. Another side 19b of the base combines with the upper lid 20 to form a groove 24 for engagement with the heat generating element. Said side 19b also combines with the lower lid 21 to form an elevation 25 for supporting the heat generating element as well as a projection 26 on the side 19b.

The arrangement described above enables the heat resistant holder 18 to be installed on the annular outer wall 13 in such a manner that the upper installation groove 22 engages the notch 17 and the lower installation groove 23 engages the annular projection 15 to provide intimate contact between the side 19a of the base and the inner surface 13b of the annular outer wall.

The heat generating element 27 consists of a heat generating agent and an active ingredient placed in a container 28 that is held in position by the plurality of heat resistant holders 18 on the sides 19b of the bases. Along the upper outer periphery of the container 28, an annular upward facing projection 29 engages a downward facing projection 24a of said groove 24.

When the heat generating element 27 is fit in the safety container 14, the upward facing projection 29 is interfered with by the downward facing projection 24a to deform until it engages the groove 24 of the heat resistant holder 18, and at the same time, the bottom face 28a of the container abuts on the elevation 25 for supporting the heat generating element, with the outer face 28b of the container pressed against the projection 26. As a result, the heat generating element 27 is supported in the safety container 14 by means of the plurality of heat resistant holders 18 in such a manner that the outer face 28b of the element 27 is separate from the inner surface 13b of the annular outer wall 13.

Therefore, even if the heat generating element 27 generates intense heat, the heat is hardly transmitted to the annular outer wall 13, keeping the safety container 14 substantially unheated. For this reason, the container can be placed directly in a room without causing fire hazard. In addition, a human will not get a burn if he touches it, and hence, it can be carried by hand when in use.

Another advantage of this invention is its low manufacturing cost. The safety container 14 can be made of an inexpensive synthetic resin, metallic material, natural or synthetic fiber material or the like by, for example, fabrication or molding or the like and, if necessary, subjecting to hardening process, and only the heat resistant holder 18 is made of relatively expensive heat resistant material such as nylon mixed with 30% of glass fibers, metallic material or heat resistance-imparted material. It is to be understood that various modifications of this invention are possible; for example, an active ingredient 30 shaped in a mat form is pasted to the bottom 28a of the container as shown by the phantom line in FIG. 7; the active ingredient given a predetermined form is contained in the container 28; the top opening in the safety container 14 is covered with a cap having a plurality of slits; or instead, the annular projection 15 is omitted and the heat resistant holder 18 is directly installed through engagement with the annular outer wall 13.

Figure 10:
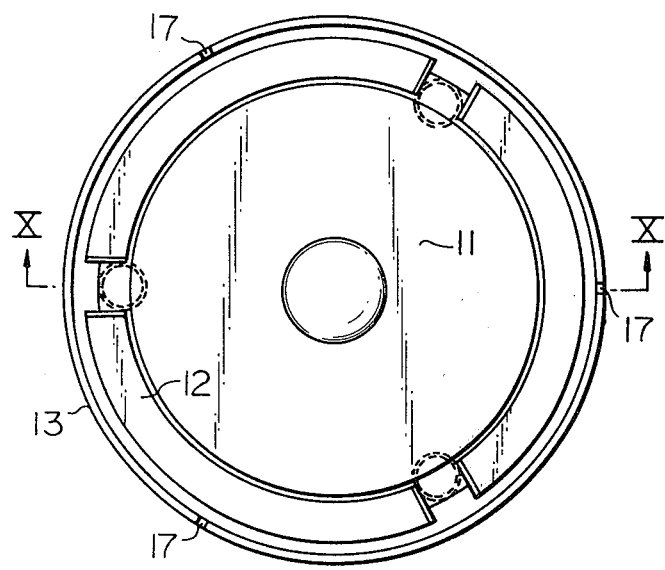
Figure 11:
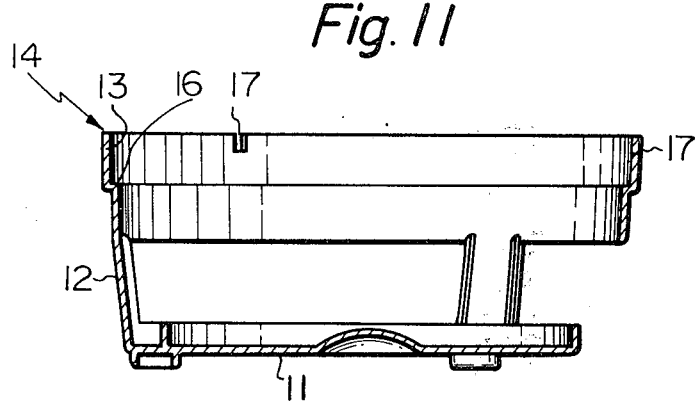

As shown in FIGS. 10 and 11, the safety container 14 may be so constructed that a plurality of installation walls 12 are continuous from the bottom 11, and the annular outer wall 13 is formed integrally with the upper end of each installation wall 12.

Figure 12:
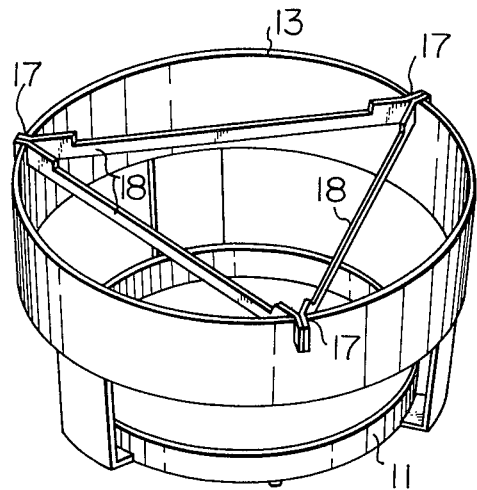
Figure 13:

Instead, as shown in FIGS. 12 and 13, three long thin plates of heat resistant holder 18 may be arranged in a triangular form, with both ends of each of two adjacent plates being slightly bent and joined together to form an apex that is to be inserted in each notch 17 of the annular outer wall 13.

Figure 14:
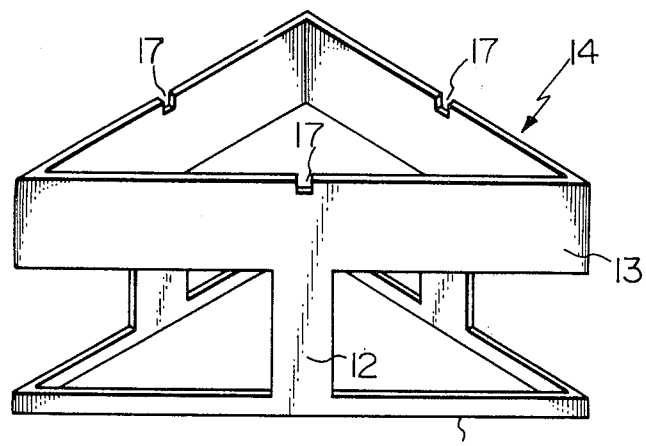
Figure 15:
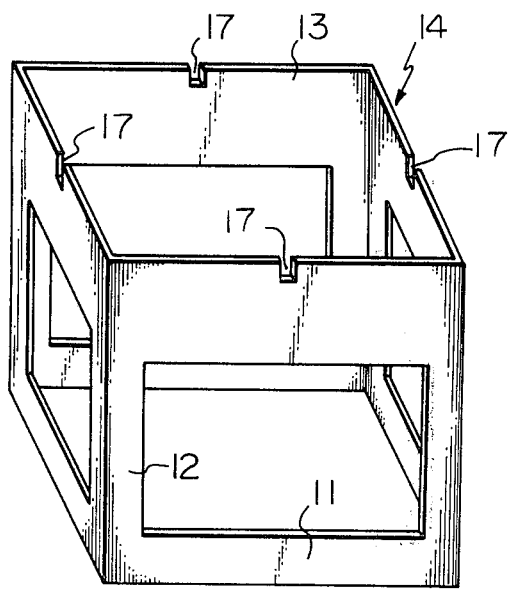

The container 14 may assume a triangular or rectangular shape as shown in FIGS. 14 and 15.

Figure 16:
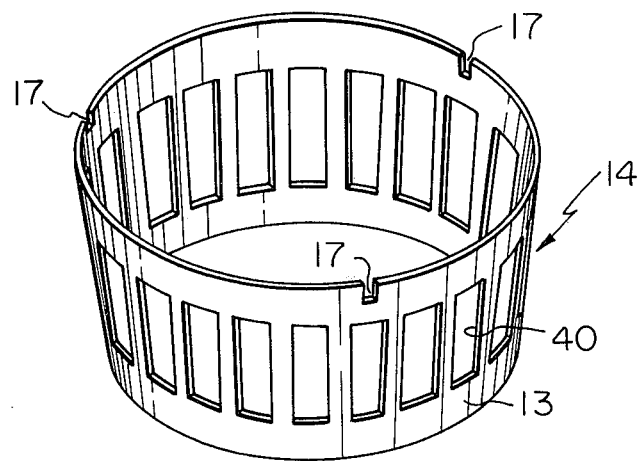
Figure 17:
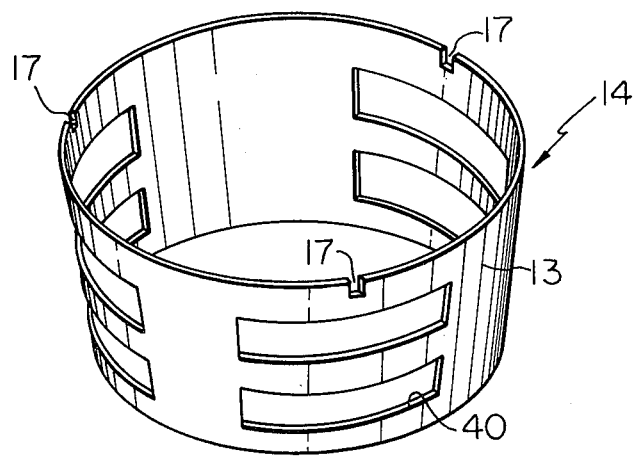

As shown in FIGS. 16 and 17, the container 14 may comprise only a cylindrical annular outer wall 13. In FIGS. 16 and 17, the numeral 40 indicates a slit.

Figure 18:
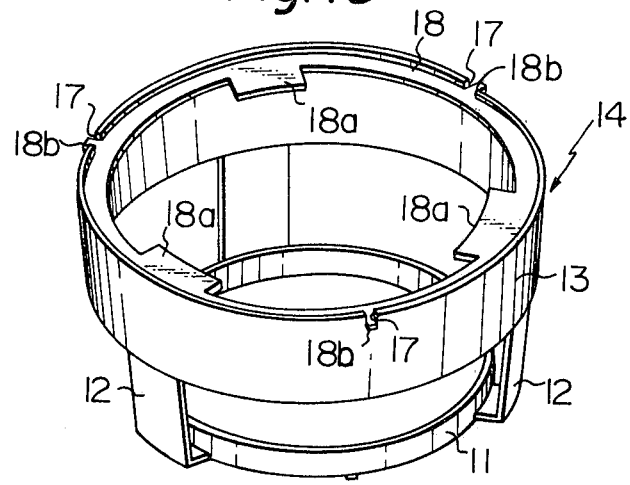
Figure 19:
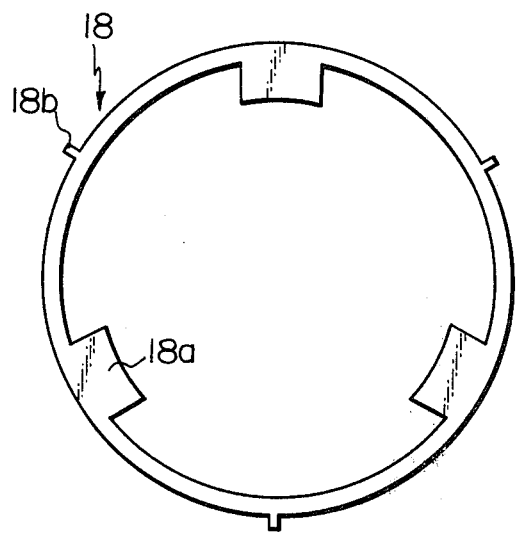

As shown in FIGS. 18 and 19, the heat resistant holder 18 may assume a thin-walled ring form which has a plurality of projections 18a formed along the inner periphery at a given interval and a plurality of projections 18b for engaging each of the notches 17 of the annular outer wall 13.

According to the safety container assembly of this invention that is constructed as described in the foregoing, the heat generating element 27 is supported on the annular outer wall 13 of the container 14 via a plurality of heat resistant holders 18, and for this reason, very little of the heat generated by the element 27 is transmitted to the annular outer wall 13. Therefore, the safety container 14 can be placed in a room directly without causing a fire hazard or damage to the room. What is more, a human can touch it without getting a burn, and so he can carry it by hand in use.

As a further advantage, the container assembly of this invention can be manufactured at reasonable cost because the container 14 may be made of an inexpensive material whereas only the heat resistant holders 18 may be made of relatively expensive heat resistant material.

FIG. 1 is a cross-sectional view of an insecticidal apparatus according to one embodiment of this invention.

Figure 3:
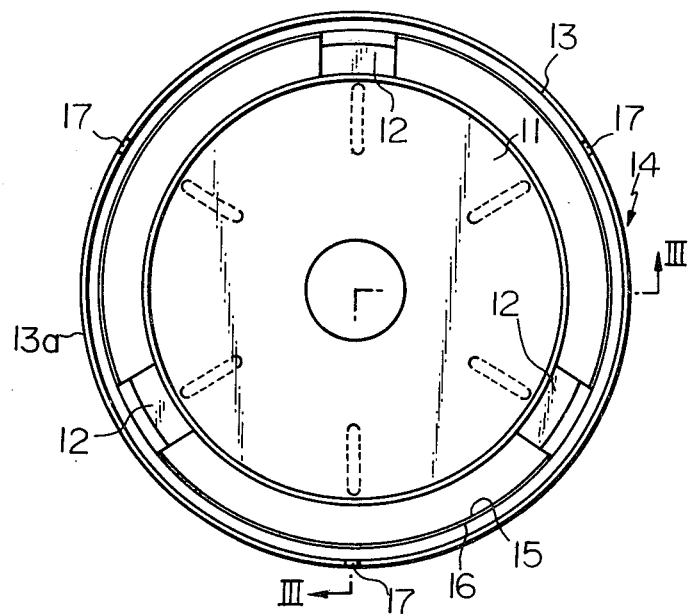
Figure 4:
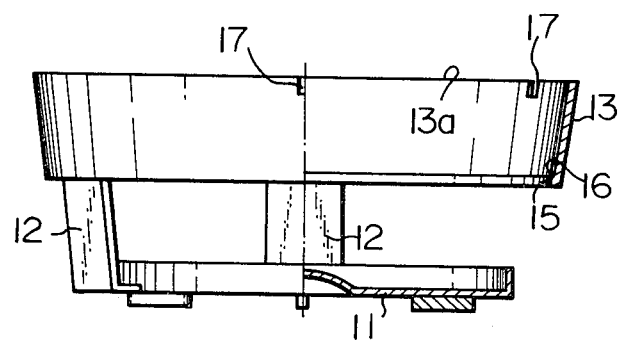
Figure 8:
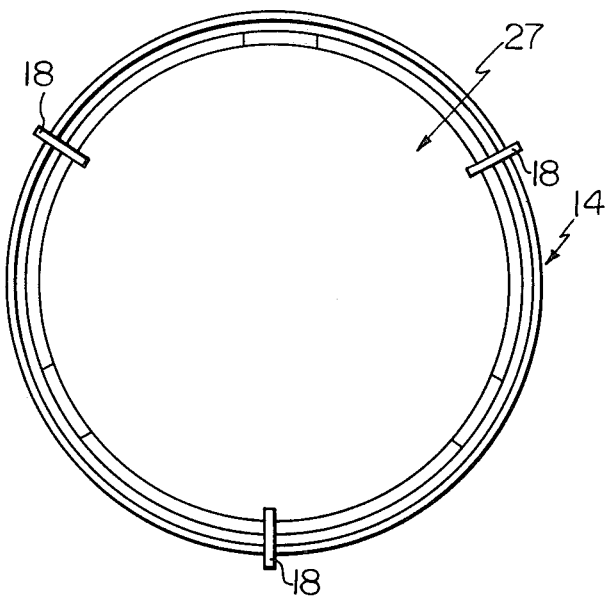
Figure 9:
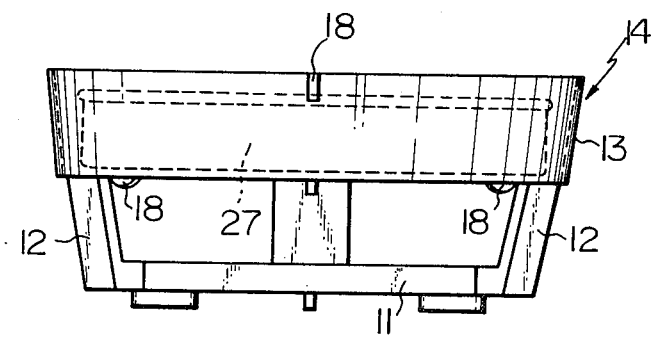

FIGS. 2 thru 19 illustrate various embodiments of a safety container assembly for use in the insecticidal apparatus of this invention. FIG. 2 is a general perspective view; FIG. 3 is a plan view of a container member; FIG. 4 is a cross section taken on the line III—III of FIG. 3; FIG. 5 is a front view of the heat resistant holder; FIG. 6 is a cross section of the container as supported by the holders; FIG. 7 is a front view of the heat generating element; FIG. 8 is a plan view of the heat generating element as installed in the container assembly; FIG. 9 is a front view of the heat generating element as shown in FIG. 8; FIG. 10 is a plan view of another embodiment of the safety container assembly; FIG. 11 is a cross section taken on the line X—X of FIG. 10; FIG. 12 is a perspective view of still another embodiment of the container assembly; FIG. 13 is a front view of each of the heat resistant holders used in FIG. 12; FIGS. 14, 15, 16 and 17 are perspective views of various embodiments of the container member; FIG. 18 is a perspective view of another embodiment of the container member; and FIG. 19 is a plan view of the heat resistant holder used in the embodiment shown in FIG. 18.

In the figures, 1 and 27 are each a heat generating element, 2 is a container member, 3 is a heat generating agent, 6 is a porous carrier, 7 is a receptacle, 8 is a receiving tray, 9 is a supporting stand, 13 is an annular outer wall, 14 is a safety container member, and 18 is a heat resistant holder.

I claim:

1. A thermoevaporative insecticidal apparatus, comprising:

a chemically-reactive heat generating element;

a porous carrier closely fitted to the underside of said heat generating element, the surface of said porous carrier being impregnated with a thermoevaporative insecticidally effective ingredient;

a receiving tray; and support means connecting said receiving tray and said heat generating element such that said receiving tray is supported below said porous carrier at a distance therefrom of at least one centimeter.

* * * * *